United States Patent
Rehm et al.

(10) Patent No.: US 6,434,030 B1
(45) Date of Patent: Aug. 13, 2002

(54) ARRANGEMENT HAVING A SWITCHED-MODE POWER SUPPLY AND A MICROPROCESSOR

(75) Inventors: Markus Rehm; Thomas Riesle; Jose Ignacio Rodriquez-Duran, all of Villingen-Schwenningen (DE); Kum Yoong Zee, Johor (MY); Choon Meng Chan, Singapore (SG)

(73) Assignee: Thomas Licensing SA, Boulogne Cedex (FR)

( * ) Notice: Subject to any disclaimer, the term of this patent is extended or adjusted under 35 U.S.C. 154(b) by 0 days.

(21) Appl. No.: 09/327,064

(22) Filed: Jun. 7, 1999

(Under 37 CFR 1.47)

(51) Int. Cl.$^7$ ................................................. H02M 3/24
(52) U.S. Cl. .................. 363/97; 363/21.07; 363/21.08; 363/21.15; 363/21.16; 315/411
(58) Field of Search .............................. 363/21, 95, 97, 363/131, 16, 49, 21.04, 21.07, 21.08, 21.12, 21.15, 21.16, 80; 323/902; 315/411

(56) References Cited

U.S. PATENT DOCUMENTS

| | | | |
|---|---|---|---|
| 5,041,956 A | * | 8/1991 | Marinus ....................... 363/21 |
| 5,126,930 A | | 6/1992 | Ahn |
| 5,477,279 A | | 12/1995 | Chang |
| 5,491,794 A | | 2/1996 | Wu |
| 5,852,550 A | * | 12/1998 | Majid et al. ................... 363/21 |
| 5,995,384 A | * | 11/1999 | Majid et al. ................... 363/21 |
| 6,005,789 A | * | 12/1999 | Lee ............................... 363/95 |

FOREIGN PATENT DOCUMENTS

| | | | | |
|---|---|---|---|---|
| DE | 3731645 | | 3/1989 | |
| DE | 19613453 | | 4/1997 | |
| DE | 19837919 | | 8/1998 | |
| DE | 198 37 919 | * | 8/1998 | ..................... 3/335 |

* cited by examiner

*Primary Examiner*—Bao Q. Vu
*Assistant Examiner*—Gary L. Laxton
(74) *Attorney, Agent, or Firm*—Joseph S. Tripoli; Harvey D. Fried; Joseph J. Kolodka

(57) ABSTRACT

A switched-mode power supply with a control loop and a microprocessor has a normal mode and a low-power mode with a burst mode. The microprocessor is connected via an output to the control loop and uses this to control the burst mode of the switched-mode power supply directly. The control loop of the switched-mode power supply monitors, in particular, a secondary output voltage, so that the output of the microprocessor is connected to the control loop, for example via a simple resistor network or a transistor stage. The clock frequency and the duty cycle of the burst mode are permanently stored in the microprocessor and can be defined for the switched-mode power supply directly, for example using TTL logic.

8 Claims, 2 Drawing Sheets

ARRANGEMENT HAVING A SWITCHED-MODE POWER SUPPLY AND A MICROPROCESSOR

BACKGROUND

The invention is based on an arrangement having a microprocessor and a switched-mode power supply with a control loop, the switched-mode power supply having a normal mode and a low-power mode, e.g. a standby mode, with a burst mode. Arrangements of this type are used in television sets or video recorders, for example.

In the low-power mode, switched-mode power supplies frequently use a so-called burst mode, in which the switching transistor is turned off completely at a low clock frequency, e.g. 100 Hz, during an off-phase. During the on-phase of the burst mode, the switched-mode power supply operates at its normal switching frequency, at which there is active control, e.g. 16 kHz. This means that the burst mode ensures that the switched-mode power supply transfers power to the secondary side only during the short interval of the on-phase, in which the said switched-mode power supply is able to operate at a high switching frequency; as a result of this, a switched-mode power supply, in particular an isolating-transformer switched-mode power supply, can be used to achieve very low standby powers. Switched-mode power supplies having a burst mode are disclosed in EP-A 0 386 989 and DE-A-195 18 863, for example.

This burst mode is produced either by a special switched-mode power supply IC or by an additional circuit arrangement on the primary side of the switched-mode power supply.

The invention is based on the object of specifying an arrangement which has a very reliable burst mode and, in addition, reduces the circuit complexity.

BRIEF SUMMARY OF THE INVENTION

This object is achieved by the invention indicated in claim 1. Advantageous developments of the invention are indicated in the subclaims.

According to the invention, a switched-mode power supply having a control loop and having a normal mode and a low-power mode with a burst mode is connected to a microprocessor connection by means of which the said microprocessor controls the burst mode of the switched-mode power supply. Since devices such as television sets or video recorders usually already have a microprocessor anyway, the circuit complexity for the burst mode is very low. This is particularly true in a switched-mode power supply with mains isolation if the control loop of the switched-mode power supply monitors a secondary output voltage, so that the output of the microprocessor can be connected directly to the control loop via one or more resistors or possibly a transistor stage. In battery-operated devices without mains isolation, the arrangement can be designed in the same way.

This means that the microprocessor is able to control the clock frequency and the duty cycle of the burst mode directly without an analogue/digital converter, for example using TTL logic.

A fixed duty cycle can be defined for the burst mode by the microprocessor, which provides steady burst-mode operation even with very low standby powers, such as 2 watts. By changing the clock frequency and the duty cycle, the switched-mode power supply can be matched quickly to changes in conditions. The burst mode can be started in a controlled manner whenever a user switches the appropriate device to the low-power mode, and is not produced indirectly, as is presently the case in a television set, for example, where turning off the deflection and the video stages, which causes the output voltages of the switched-mode power supply to rise, initiates the low-power-mode.

In the low-power mode, the microprocessor-controlled burst mode can also reduce the output voltages considerably, for example to 50%. In a television set, this can produce a soft picture collapse. For this type of use, when a user switches the television set to low-power mode, the microprocessor firstly reduces the system voltage and only then, after a delay, turns off the deflection and the video circuit. Without this procedure, the picture tube of the television set would light up briefly. When switching from low-power mode to normal mode, the deflection and the video stage are switched on after a delay, and only after the output voltages of the switched-mode power supply have stabilized. This means that faults in the deflection cannot occur when it is turned on, because, when it is turned on, its power consumption loads the output voltages of the switched mode power supply significantly, so that voltage fluctuations can occur.

In addition, the microprocessor-controlled burst mode reliably handles an overload, caused by a short circuit, for example. In the previous burst mode, the switched-mode power supply would change over to the normal mode in the event of a short circuit, because the higher power requirement causes it to assume that the television set has been switched to normal mode. In the microprocessor-controlled burst mode, on the other hand, the burst mode is defined to be fixed, and changeover is possible only as a result of a user command via the microprocessor. It is likewise impossible for the switched-mode power supply to change to the burst mode unintentionally, for example if the power consumption in the normal mode is very low for a short time. Since the burst mode is initiated indirectly in previous designs, never directly by a user, the logic decision for the switched-mode power supply to change to the required low-power mode is never as reliable as when there is direct input via the microprocessor.

BRIEF DESCRIPTION OF THE DRAWINGS

The invention is explained in more detail below by way of example, using exemplary embodiments illustrated in the figures.

DESCRIPTION OF THE PREFERRED EMBODIMENTS

Figure 1:
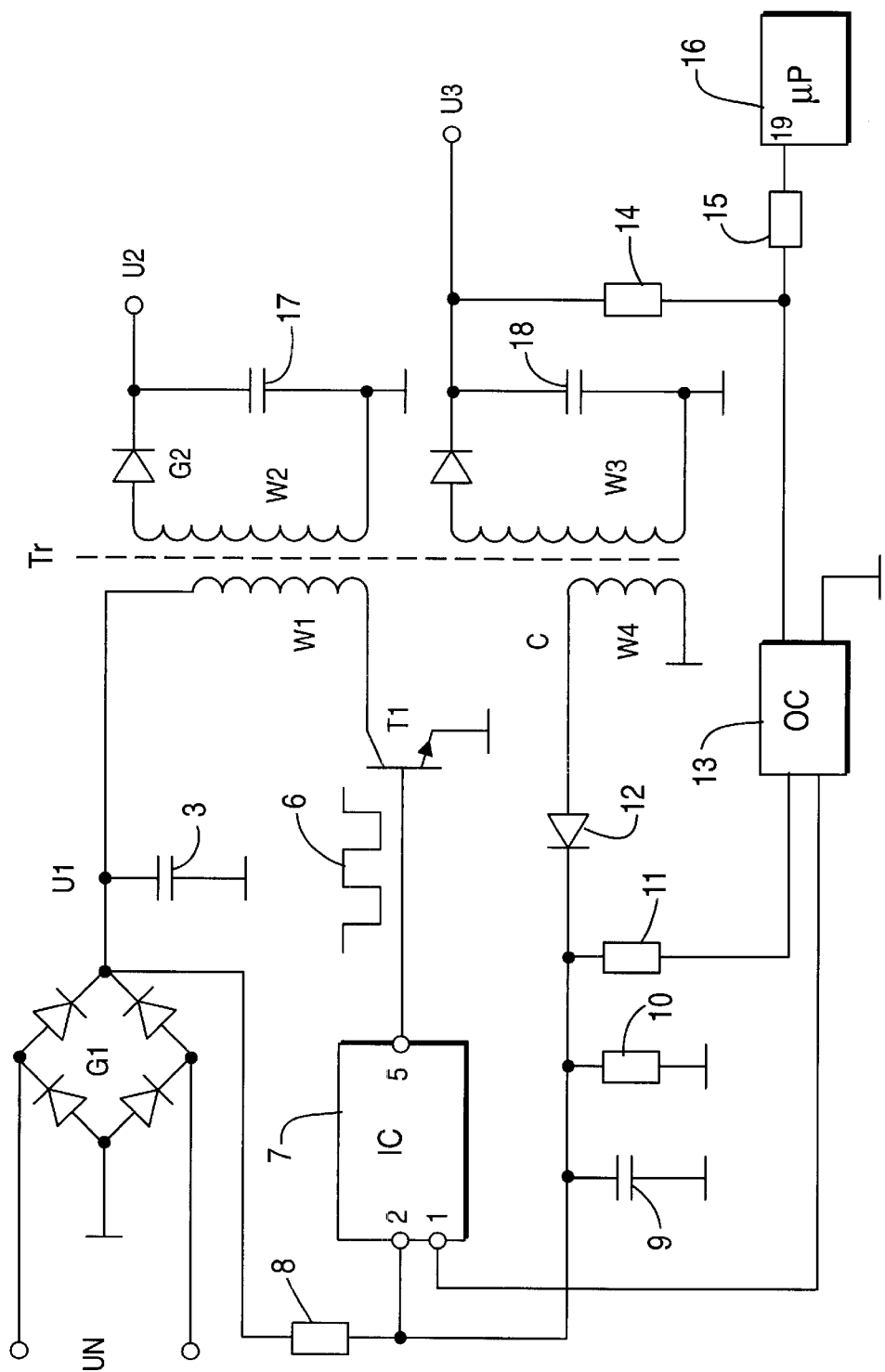
FIG. 1 shows a switched-mode power supply with a control loop connected to a microprocessor.

The switched-mode power supply shown in FIG. 1 operates on the flyback-converter principle and has its input connected to a mains voltage UN which is converted by means of a rectifier G1 and a capacitor 3 to a smoothed DC voltage (voltage U1). The switched-mode power supply contains a transformer Tr with a primary winding W1, connected in series with the voltage U1 and a switching transistor T1. In this exemplary embodiment, the driver stage of the switching transistor T1 is produced by an integrated circuit 7, although other solutions, with discrete transistor stages which can operate both in free-running and synchronized fashion, are also possible. A resistor 8 connected to the voltage U1 is used to enable the switched-mode power supply to start up. During operation, the switched-mode power supply is itself supplied with voltage by means of an auxiliary winding W4, a diode D12, capacitor 9 and resistor 10. The switching transistor T1 is operated by the integrated circuit 7, for example using a square-wave signal 6 at a frequency usually higher than 16 kHz, since the switched-mode power supply is not able to cause any audible noises in this frequency range and the transformer becomes more compact at a higher frequency.

The switched-mode power supply uses secondary windings W2 and W3 of the transformer Tr to produce output voltages U2 and U3, which are smoothed by rectifiers G2 and G3 and capacitors 17, 18. The output voltages U2 and U3 are stabilized by a control loop, the control loop being connected to the output voltage U3 in this exemplary embodiment. In this instance, the control loop is represented in simplified form by a resistor 14 and an optocoupler 13, and transmits an analogue signal to a control input 1 of the integrated circuit 7. The microprocessor 16 can use a digital signal, for example a TTL signal, from its output 19 to start the burst mode and the normal mode of the switched-mode power supply directly.

In the exemplary embodiment shown in FIG. 1, mains isolation is produced by the transformer Tr and the optocoupler 13, the windings W1 and W4 being arranged on the primary and the windings W2 and W3 being arranged on the secondary. Other refinements, such as the use of a transformer instead of the optocoupler 13, or transmission of the control signal via the transformer Tr in the off-phase of the switching transistor T1, are also possible. In battery-powered devices, the arrangement is produced using a microprocessor 16 and a switched-mode power supply without mains isolation.

Figure 2:
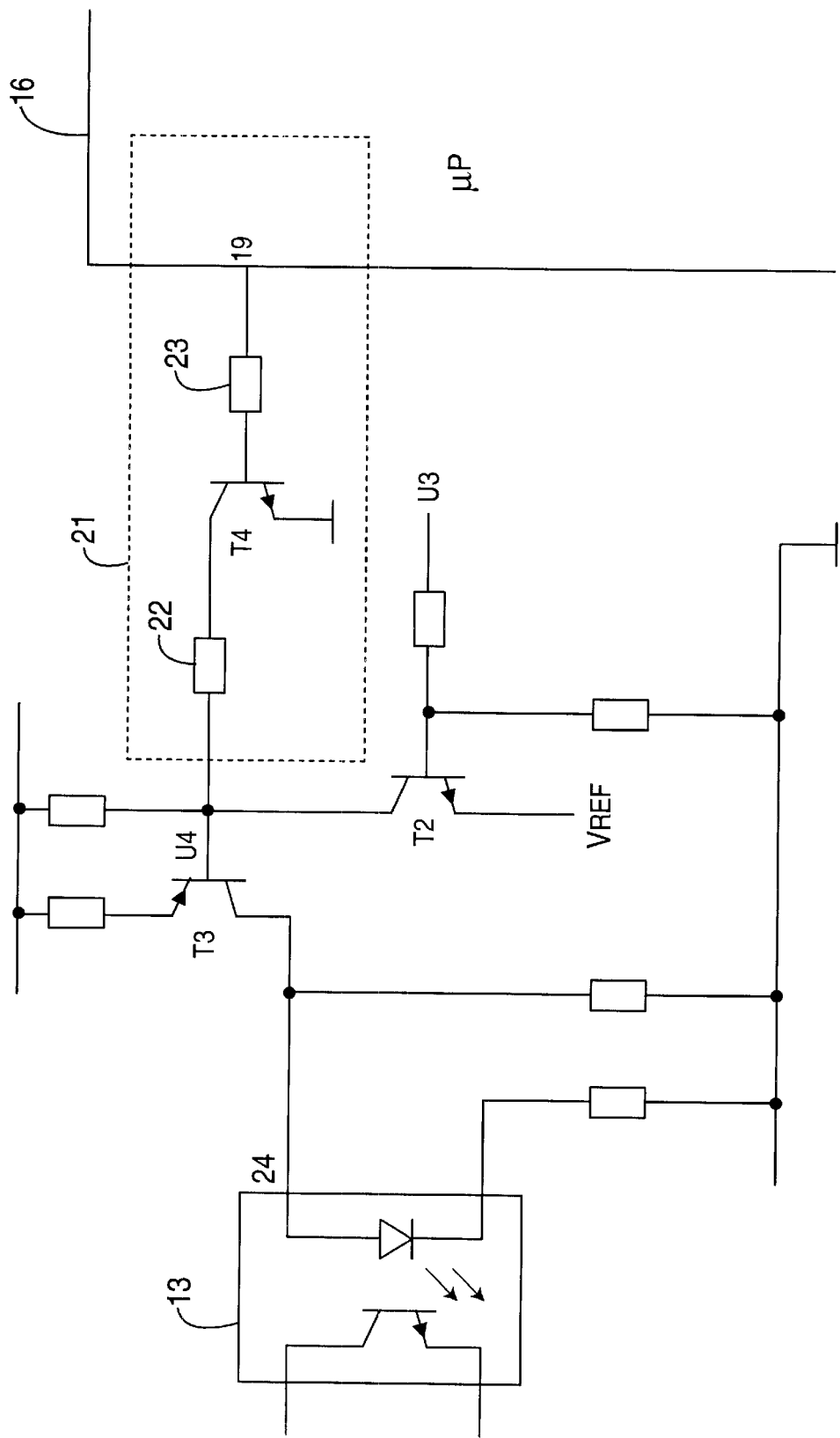
FIG. 2 shows a drive stage for connecting an output of a microprocessor to a control loop.

FIG. 2 shows the secondary control loop, based on the voltage U3 to be regulated, and the secondary circuitry of the optocoupler 13. Two transistor stages T2 and T3 are used to amplify fluctuations in the output voltage U3 and transmit them to the input 24 of the optocoupler. In this exemplary embodiment, the output 19 of the microprocessor 16 is connected to the control loop via a simple transistor stage 21 comprising a transistor T4 and two resistors 22, 23. Using a TTL signal, the microprocessor 16 can switch between low-power mode and normal mode: when the output 19 switches to "0" or "low", then the transistor T4 is off and the voltage U4 at the base of the transistor T3 is high, so that the transistor T2 is on and, as a result, the output voltage U3 is actively controlled. If the output signal from the output 19 is "high", then transistor T4 is on and therefore pulls down the base voltage U4. This turns on the transistor T3 fully, so that a maximum signal is transmitted via the optocoupler 13, as a result of which the switched-mode power supply turns off.

What is claimed is:

1. Arrangement comprising a microprocessor and a switched-mode power supply having a normal mode and a low-power burst mode, said switched-mode power supply comprising a transformer with a primary winding and a secondary winding providing a secondary side output voltage, a switching transistor coupled to said primary winding, a primary side driver stage coupled to said switching transistor for driving said switching transistor, a control loop being coupled to said secondary side output voltage, for providing a control signal to said driver stage for a regulation of said output voltage, and an output of said microprocessor being coupled to said control loop, for initiating said burst mode and controlling the duty cycle of said burst mode via a control signal of said microprocessor.

2. Arrangement according to claim 1, characterized in that the output of said microprocessor is coupled via a transistor stage to said control loop.

3. Arrangement according to claim 1, characterized in that the output of said microprocessor is coupled via a resistor network to said control loop.

4. Arrangement according to claim 1, characterized in that said transformer provides a mains isolation, and that said control loop comprises an opto-coupler for transferring said control signal to the primary side.

5. Arrangement according to claim 1, characterized in that said microprocessor controls also the clock frequency of said burst mode.

6. Arrangement according to claim 5, characterized in that the clock frequency and the duty cycle of said burst mode are permanently stored in said microprocessor.

7. Arrangement comprising a microprocessor and a switched-mode power supply having a normal mode and a low-power burst mode, said switched-mode power supply comprising a transformer with a primary winding and a secondary winding providing an output voltage, a switching transistor coupled to said primary winding, a driver stage coupled to said switching transistor for driving said switching transistor, a control loop being coupled to said output voltage, for providing a control signal to said driver stage for a regulation of said output voltage, and an output of said microprocessor being coupled to said control loop, for initiating said burst mode the duty cycle and the clock frequency of said burst mode via "high" and "low" signals of said microprocessor.

8. Arrangement comprising a microprocessor and a switched-mode power supply having a normal mode and a low-power burst mode, said switched-mode power supply comprising a transformer with a primary winding and a secondary winding providing an output voltage, a switching transistor coupled to said primary winding, a driver stage coupled to said switching transistor for driving said switching transistor, a control loop being coupled to said output voltage, for providing a control signal to said driver stage for a regulation of said output voltage, and an output of said microprocessor being coupled to said control loop, for initiating said burst mode and controlling the on-and off-phases of said burst mode via "high" and "low" signals of said microprocessor.

* * * * *